(12) United States Patent
Ono et al.

(10) Patent No.: US 11,225,140 B2
(45) Date of Patent: Jan. 18, 2022

(54) FOUR-WHEEL DRIVE VEHICLE

(71) Applicant: JTEKT CORPORATION, Osaka (JP)

(72) Inventors: Tomonori Ono, Yatomi (JP); Go Nagayama, Toyama (JP)

(73) Assignee: JTEKT CORPORATION, Osaka (JP)

(*) Notice: Subject to any disclaimer, the term of this patent is extended or adjusted under 35 U.S.C. 154(b) by 54 days.

(21) Appl. No.: 16/879,857

(22) Filed: May 21, 2020

(65) Prior Publication Data
US 2020/0376958 A1 Dec. 3, 2020

(30) Foreign Application Priority Data

May 30, 2019 (JP) .............................. JP2019-101425

(51) Int. Cl.
*B60K 23/04* (2006.01)
*B60K 17/348* (2006.01)
*B60K 17/22* (2006.01)
*B60K 23/08* (2006.01)

(52) U.S. Cl.
CPC ............ *B60K 17/348* (2013.01); *B60K 17/22* (2013.01); *B60K 23/04* (2013.01); *B60K 23/08* (2013.01); *B60K 2023/043* (2013.01); *B60K 2023/0858* (2013.01)

(58) Field of Classification Search
CPC ...... B60K 17/348; B60K 17/22; B60K 23/04; B60K 23/08; B60K 2023/043; B60K 2023/0858; B60K 17/35; B60K 17/34
See application file for complete search history.

(56) References Cited

U.S. PATENT DOCUMENTS

| 9,758,167 B1* | 9/2017 | Pandit ................. B60W 30/188 |
| 2006/0162981 A1* | 7/2006 | Kurosawa ............. B60T 8/1755 |
| | | 180/249 |
| 2009/0127014 A1 | 5/2009 | Ushiroda et al. |

FOREIGN PATENT DOCUMENTS

| JP | 2004338685 A | * 12/2004 | ............. B60K 28/16 |
| JP | 2007-022369 A | 2/2007 | |

\* cited by examiner

*Primary Examiner* — Justin Holmes
(74) *Attorney, Agent, or Firm* — Oblon, McClelland, Maier & Neustadt, L.L.P.

(57) ABSTRACT

A four-wheel drive vehicle includes right and left main drive wheels and right and left auxiliary drive wheels, and a drive force transmission system configured to constantly transmit a drive force of a drive source to the right and left main drive wheels and to transmit the drive force to the right and left auxiliary drive wheels depending on a vehicle state. The drive force transmission system includes a differential device, a propeller shaft, a drive force transmission device configured to adjust the drive force that is transmitted from the propeller shaft to the right and left auxiliary drive wheels, and an electronic control unit configured to control the drive force transmission device.

3 Claims, 4 Drawing Sheets

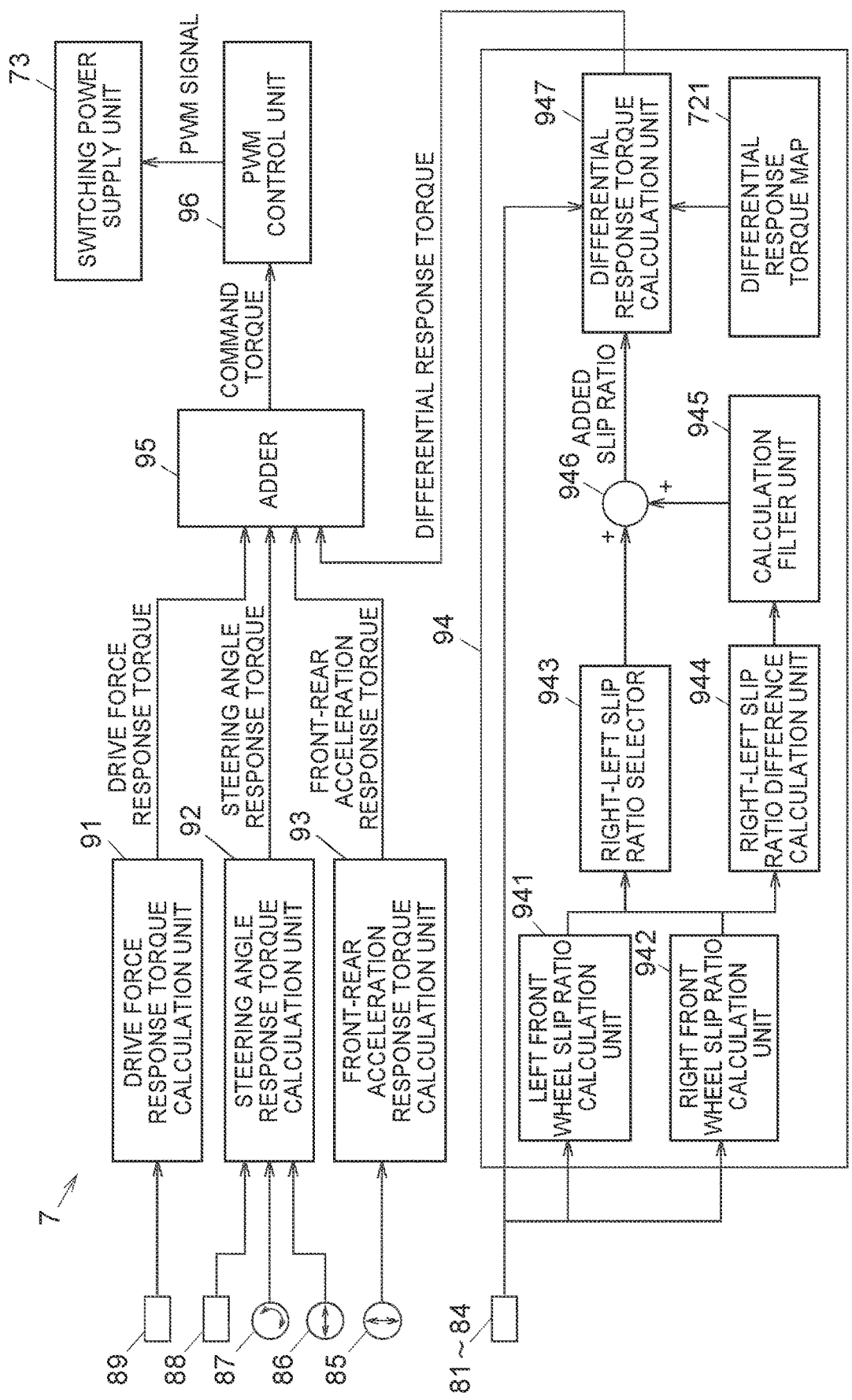

FOUR-WHEEL DRIVE VEHICLE

CROSS-REFERENCE TO RELATED APPLICATION

This application claims priority to Japanese Patent Application No. 2019-101425 filed on May 30, 2019, incorporated herein by reference in its entirety.

BACKGROUND

1. Technical Field

The disclosure relates to a four-wheel drive vehicle having right and left main drive wheels and right and left auxiliary drive wheels.

2. Description of Related Art

Hitherto, there is known an on-demand four-wheel drive vehicle in which a drive force from a drive source is constantly transmitted to right and left front wheels and a drive force is distributed to right and left rear wheels depending on a traveling state of a vehicle (for example, see Japanese Unexamined Patent Application Publication No. 2007-22369 (JP 2007-22369 A)). In such a four-wheel drive vehicle, the drive state is set to a two-wheel drive state during normal traveling to suppress a decrease in fuel efficiency, whereas the drive state is set to a four-wheel drive state so that the torque of the auxiliary drive wheels is increased when, for example, a slip occurs in the main drive wheels during situations such as starting and acceleration on a road with low friction coefficient, thereby allowing the running performance to be improved.

JP 2007-22369 A discloses a four-wheel drive vehicle equipped with a right-left wheel differential limiting mechanism, a front-rear wheel differential limiting mechanism, and an electronic control unit (ECU). The right-left wheel differential limiting mechanism is provided between the right and left front wheels to which the drive force is constantly transmitted and applies a differential limiting force between the right and left wheels. The front-rear wheel differential limiting mechanism is provided at one end of a propeller shaft and applies a differential limiting force between the front and rear wheels. The ECU controls the differential limiting mechanisms. The ECU controls the front-rear wheel differential limiting mechanism to adjust the drive force that is distributed to the rear wheels depending on the traveling state of the vehicle. For example, when a slip occurs in the front wheels during turning, the ECU controls the front-rear wheel differential limiting mechanism to increase the torque of the rear wheels so that understeer is not promoted.

SUMMARY

In the four-wheel drive vehicle configured as described above, for example, when a slip occurs in one of the front wheels during traveling, a part of the drive force is distributed to the rear wheels to suppress the slip. However, the turning performance of the four-wheel drive vehicle is not necessarily improved with such a drive force distribution control.

The disclosure provides a four-wheel drive vehicle that can improve the turning performance when a slip occurs in one of the right and left main drive wheels.

A four-wheel drive vehicle according to a first aspect of the disclosure includes right and left main drive wheels and right and left auxiliary drive wheels, and a drive force transmission system configured to constantly transmit a drive force of a drive source to the right and left main drive wheels and to transmit the drive force to the right and left auxiliary drive wheels depending on a vehicle state. The drive force transmission system includes a differential device configured to distribute the drive force to the right and left main drive wheels, a propeller shaft configured to transmit the drive force in a vehicle front-rear direction, a drive force transmission device configured to adjust the drive force that is transmitted from the propeller shaft to the right and left auxiliary drive wheels, and an electronic control unit configured to control the drive force transmission device. The differential device has a differential limiting function that generates a differential limiting force for limiting a differential rotation between the right and left main drive wheels. The electronic control unit is configured to perform, when a slip occurs in one of the right and left main drive wheels and the electronic control unit controls the drive force transmission device to transmit the drive force to the right and left auxiliary drive wheels, a delay process for delaying a rise of the drive force that is transmitted by the drive force transmission device.

According to the disclosure, when a slip occurs in one of the right and left main drive wheels, the turning performance can be improved by using the differential limiting device for the main drive wheels.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a control block diagram illustrating an example of control executed by a control device;

DETAILED DESCRIPTION OF EMBODIMENTS

Embodiment

An embodiment of the disclosure will be described with reference to FIGS. 1 to 4C. The embodiment described below is represented as specific examples suitable for carrying out the disclosure. Although some parts exemplify various technical matters that are technically preferable, the technical scope of the disclosure is not limited to the specific examples.

Figure 1:
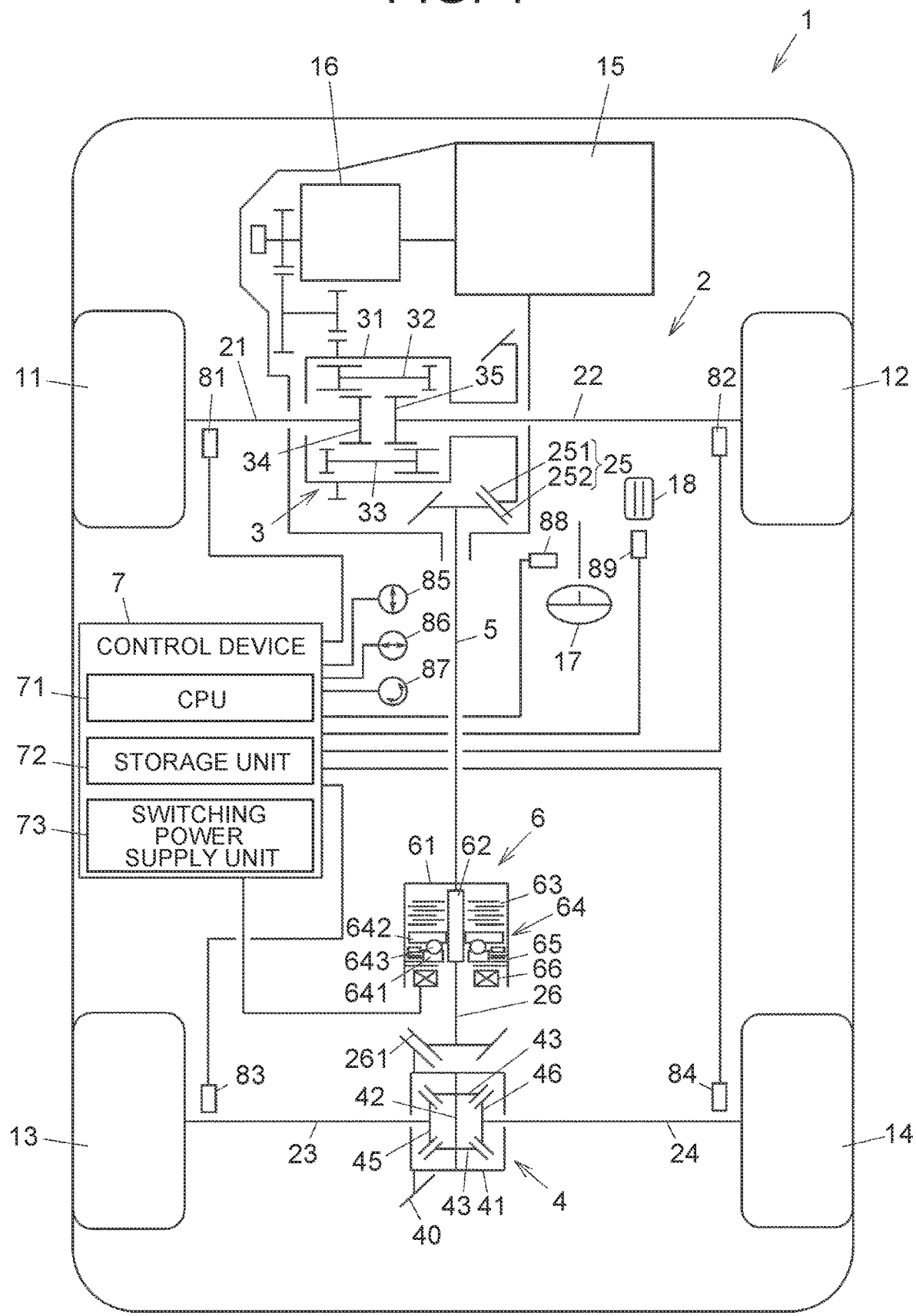
FIG. 1 is a schematic diagram illustrating an example of a configuration of a four-wheel drive vehicle according to an embodiment of the disclosure.

FIG. 1 is a schematic diagram illustrating an example of a configuration of a four-wheel drive vehicle 1 according to the embodiment of the disclosure. The four-wheel drive vehicle 1 has, a right front wheel 12 and a left front wheel 11 as right and left main drive wheels, a right rear wheel 14 and a left rear wheel 13 as right and left auxiliary drive wheels, an engine 15 serving as a drive source, a transmission 16 for changing the rotation speed of an output shaft of the engine 15, and a drive force transmission system 2 that transmits a drive force of the engine 15, the speed of which has been changed by the transmission 16, to the right and left front wheels 12, 11 and the right and left rear wheels 14, 13. An electric motor may be used as the drive source, and alternatively the drive source may be composed of a so-called hybrid system in which an engine and an electric motor are combined.

The drive force transmission system 2 constantly transmits the drive force of the engine 15 to the right front wheel 12 and the left front wheel 11, and distributes the drive force of the engine 15 to the right rear wheel 14 and the left rear wheel 13 depending on the vehicle state. That is, the four-wheel drive vehicle 1 is an on-demand four-wheel drive vehicle. For example, in a steady traveling state in which the vehicle travels straight at a constant speed, the drive state is set to a two-wheel drive state in which the drive force is transmitted only to the right front wheel 12 and the left front wheel 11.

The drive force transmission system 2 has right and left drive shafts 22, 21 on the front wheel side, right and left drive shafts 24, 23 on the rear wheel side, a front differential 3 serving as a differential device on the front wheel side, and a rear differential 4 serving as a differential device on the rear wheel side, a propeller shaft 5 that transmits the drive force in a vehicle front-rear direction, a drive force transmission device 6 that can adjust the drive force that is transmitted from the propeller shaft 5 to the right rear wheel 14 and the left rear wheel 13, and a control device 7 that controls the drive force transmission device 6. In the present embodiment, the drive force transmission device 6 is disposed between the propeller shaft 5 and the rear differential 4.

The front differential 3 distributes the drive force to the right front wheel 12 and the left front wheel 11. The rear differential 4 distributes the drive force to the right rear wheel 14 and the left rear wheel 13. The drive force output from the transmission 16 is transmitted to a front differential case 31 of the front differential 3, and is then transmitted from the front differential case 31 to the propeller shaft 5 via a gear mechanism 25. The front differential 3 has a differential limiting function that can generate a differential limiting force for limiting a differential rotation between the right front wheel 12 and the left front wheel 11. The configuration of the front differential 3 will be described later.

The gear mechanism 25 is, for example, a pair of hypoid gears, and has a ring gear 251 rotating integrally with the front differential case 31 and a pinion gear 252 disposed at one end of the propeller shaft 5. The other end of the propeller shaft 5 is connected to the drive force transmission device 6 via, for example, a cross joint (not shown).

The drive force transmission device 6 includes a bottomed cylindrical housing 61 to which the drive force from the propeller shaft 5 is input, an inner shaft 62 supported so as to be coaxial with the housing 61 and rotatable with respect to the housing 61, a multi-plate clutch 63 including a plurality of clutch plates disposed between the housing 61 and the inner shaft 62, a cam mechanism 64 that generates a pressing force for pressing the multi-plate clutch 63, an electromagnetic clutch 65 that transmits an operation force for operating the cam mechanism 64, and an electromagnetic coil 66 to which an excitation current is supplied from the control device 7.

When the electromagnetic coil 66 is energized, a magnetic force is generated, causing the electromagnetic clutch 65 to be engaged, and a part of a rotational force of the housing 61 is transmitted to a pilot cam 641 of the cam mechanism 64 via the electromagnetic clutch 65. The cam mechanism 64 has the pilot cam 641 and a main cam 642 that can rotate relative to each other within a predetermined angle range, and a plurality of cam balls 643 that can roll between the pilot cam 641 and the main cam 642. The pilot cam 641 and the main cam 642 are provided with cam grooves on which the cam balls 643 roll such that the cam grooves are inclined with respect to the circumferential directions of the pilot cam 641 and the main cam 642, respectively.

The main cam 642 is axially movable and non-rotatable with respect to the inner shaft 62. When the pilot cam 641 rotates relative to the main cam 642 by the rotational force transmitted from the electromagnetic clutch 65, the cam balls 643 roll in the cam grooves, causing the main cam 642 to separate from the pilot cam 641. The multi-plate clutch 63 is thus pressed, causing the clutch plates to come into frictional contact with each other, so that the drive force is transmitted between the housing 61 and the inner shaft 62. The drive force that is transmitted from the multi-plate clutch 63 changes depending on the magnitude of a current supplied to the electromagnetic coil 66.

A pinion gear shaft 26 is connected to the inner shaft 62 of the drive force transmission device 6 so as not to rotate relative to the inner shaft 62. The pinion gear shaft 26 has a gear portion 261 at its one end. The gear portion 261 of the pinion gear shaft 26 meshes with a ring gear 40 fixed to a rear differential case 41 of the rear differential 4.

The rear differential 4 has the rear differential case 41, a pinion shaft 42 that rotates integrally with the rear differential case 41, a pair of pinion gears 43 supported by the pinion shaft 42, first and second side gears 45, 46 that mesh with each of the pinion gears 43, respectively, with their gear axes disposed orthogonal to each other. A right drive shaft 24 on the rear wheel side is connected to the second side gear 46 so as not to be rotatable relative to the second side gear 46. The left drive shaft 23 on the rear wheel side is connected to the first side gear 45 so as not to be rotatable relative to the first side gear 45.

Figure 2A:
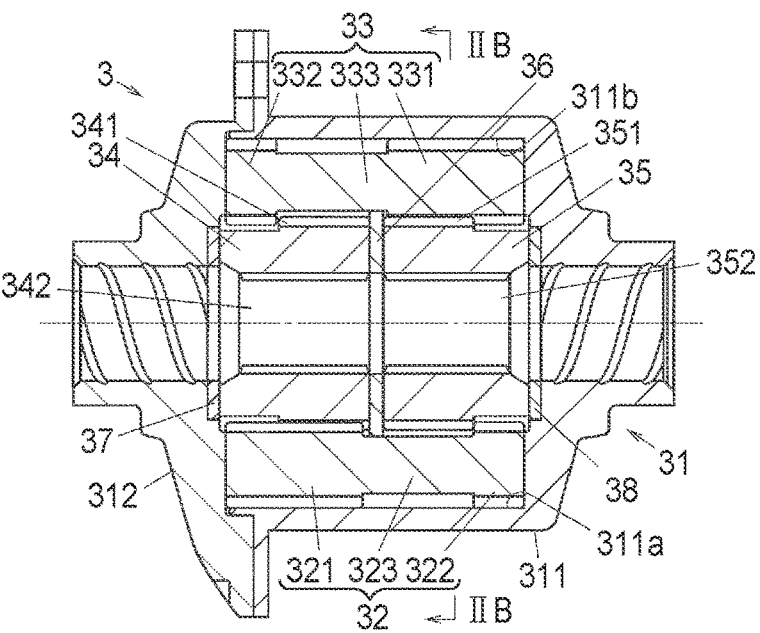
FIG. 2A illustrates an example of a configuration of a front differential, and specifically shows a sectional view taken along an axial direction.
Figure 2B:
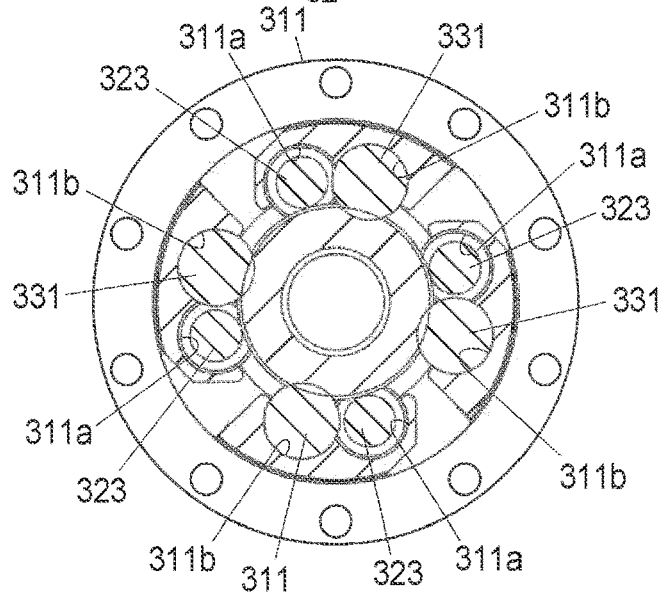
FIG. 2B illustrates the example of the configuration of the front differential, and specifically shows a cross-sectional view taken along a line IIB-IIB in FIG. 2A.
Figure 2C:
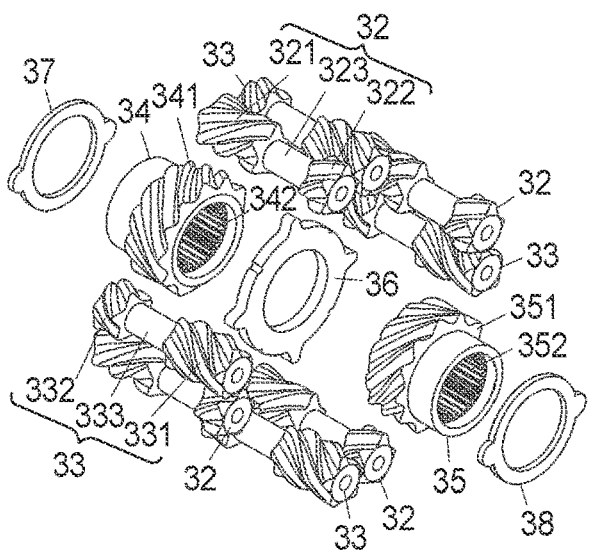
FIG. 2C illustrates the example of the configuration of the front differential, and specifically shows an exploded perspective view.

FIGS. 2A, 2B, 2C illustrate the front differential 3, and specifically FIG. 2A is a sectional view taken along the axial direction, FIG. 2B is a cross-sectional view taken along line IIB-IIB in FIG. 2A, and FIG. 2C is an exploded perspective view.

The front differential 3 has a front differential case 31 including a housing body 311 and a housing lid 312, a plurality of sets of first and second pinion gears 32, 33, first and second side gears 34, 35, a center washer 36, and a pair of side washers 37, 38. In the present embodiment, the front differential 3 has four sets of first and second pinion gears 32, 33.

The first side gear 34 has a gear portion 341 on an outer peripheral surface of the first side gear 34 and a spline fitting hole 342 to which the drive shaft 21 is connected so as not to rotate relative to the first side gear 34. The second side gear 35 has a gear portion 351 on an outer peripheral surface of the second side gear 35 and a spline fitting hole 352 to which the drive shaft 22 is connected so as not to rotate relative to the second side gear 35. The center washer 36 is disposed between the first side gear 34 and the second side gear 35. The side washer 37 is disposed such that the first side gear 34 is interposed between the side washer 37 and the center washer 36. The side washer 38 is disposed such that the second side gear 35 is interposed between the side washer 38 and the center washer 36.

The housing body 311 has bores (hollows) 311a, 311b for accommodating the four sets of the first and second pinion gears 32, 33. The bore 311a accommodating the first pinion gear 32 and the bore 311b accommodating the second pinion gear 33 communicate with each other, and the first pinion gear 32 and the second pinion gear 33 mesh with each other at this communication portion.

The first pinion gear 32 integrally has a long gear portion 321, a short gear portion 322, and a connecting portion 323 that connects the long gear portion 321 and the short gear portion 322. Similarly, the second pinion gear 33 integrally has a long gear portion 331, a short gear portion 332, and a connecting portion 333 that connects the long gear portion 331 and the short gear portion 332. The long gear portions 321, 331 and the short gear portions 322, 332 are bevel gears in which their tooth traces are spirally twisted.

The long gear portion 321 of the first pinion gear 32 meshes with the gear portion 341 of the first side gear 34 and the short gear portion 332 of the second pinion gear 33. The long gear portion 331 of the second pinion gear 33 meshes with the gear portion 351 of the second side gear 35 and the short gear portion 322 of the first pinion gear 32. These engagements generate axial thrust forces in the first and second pinion gears 32, 33 and the first and second side gears 34, 35.

When the first side gear 34 and the second side gear 35 rotate integrally with the front differential case 31 at the same speed, the first and second pinion gears 32, 33 do not rotate in the bores 311a, 311b about their own axes, but rotates integrally with the front differential case 31. In contrast, when a differential rotation occurs between the first side gear 34 and the second side gear 35, the first and second pinion gears 32, 33 rotate in the bores 311a, 311b about their own axes.

When the first and second pinion gears 32, 33 rotate about their own axes, the tip surfaces of the long gear portions 321, 331 and the short gear portions 322, 332 slide on the inner surfaces of the bores 311a, 311b, generating a frictional resistance force. This frictional resistance force serves as a differential limiting force for limiting the differential rotation between the first and second side gears 34, 35. Further, a frictional resistance force between the center washer 36 and the pair of side washers 37, 38, which is generated by a thrust force acting on the first and second side gears 34, 35 also serves as the differential limiting force for limiting the differential rotation between the first and second side gears 34, 35.

The control device 7 has a central processing unit (CPU) 71 serving as a calculation processing device, a storage unit 72 composed of a semiconductor storage element such as a read-only memory (ROM) and a random-access memory (RAM), and a switching power supply unit 73 that generates a current to be supplied to the electromagnetic coil 66 of the drive force transmission device 6. The storage unit 72 stores a program indicating a procedure of a calculation process to be executed by the CPU 71. The CPU 71 can adjust the current supplied from the switching power supply unit 73 to the electromagnetic coil 66 by increasing or decreasing a duty ratio of a pulse width modulation (PWM) signal supplied to the switching power supply unit 73. (That is, the control device 7 is an electronic control unit (ECU).)

The CPU 71 of control device 7 can detect detection values of rotation speed sensors 81 to 84 that detect the rotation speeds of the left front wheel 11, the right front wheel 12, the left rear wheel 13, and the right rear wheel 14, detection values of a front-rear acceleration sensor 85, a right-left acceleration sensor 86, and a yaw rate sensor 87, detection values of a steering angle sensor 88 that detects a steering angle of a steering wheel 17 operated by a driver, and detection values of an accelerator pedal sensor 89 that detects an amount of depression of an accelerator pedal 18. The CPU 71 controls the drive force transmission device 6 based on these detection values.

When the four-wheel drive vehicle 1 configured as described above travels on a slippery road surface such as an unpaved uphill, a slip may occur in the left front wheel 11 or the right front wheel 12. For example, when a slip occurs in the left front wheel 11, the drive force is distributed to other wheels in which no slip has occurred to stop the left front wheel 11 from slipping, so that the drive state is stabilized and the four-wheel drive vehicle 1 can continue to travel forward. During turning, a load on the wheel on the outside increases due to the centrifugal force, whereas a load on the wheel on the inside decreases. Accordingly, for example, while turning to the left, a slip is likely to occur on the left front wheel 11.

In such a case, in the drive force distribution control in the related art, the drive force that is transmitted from the drive force transmission device 6 is increased depending on a front-rear wheel rotational speed difference. The front-rear wheel rotational speed difference is the difference between a front wheel rotational speed that is the average rotation speed of the right and left front wheels 12, 11, and a rear wheel rotation speed that is the average rotation speed of the right and left rear wheels 14, 13. For example, when a slip occurs in the left front wheel 11, the front wheel rotation speed increases rapidly, so that the front-rear wheel rotation speed difference increases. Accordingly, the drive force that is transmitted from the drive force transmission device 6 to the right and left rear wheels 14, 13 is increased.

However, in such a control method in the related art, the drive force distribution ratio of the right and left rear wheels 14, 13 increases, causing a decrease in the drive force distributed to the right front wheel 12 in which no slip has occurred along with the decrease in the drive force distributed to the left front wheel 11 in which the slip has occurred. Thus, for example, even when the road surface friction coefficient of a portion of the ground that is in contact with the right front wheel 12 is high and sufficient traction is secured, the traction of the right front wheel 12 cannot be utilized.

In particular, in a four-wheel drive vehicle with a front-engine, front-wheel-drive (FF) layout as in this embodiment in which the right and left front wheels 12, 11 are the main drive wheels and the engine 15 is placed at the front of the vehicle, a ground contact load of the front wheels is larger than a ground contact load of the rear wheels. Thus, a higher turning performance may be secured by distributing the drive force to one of the right and left front wheels in which no slip has occurred rather than distributing the drive force to the rear wheels.

When a slip occurs in both the right and left front wheels 12, 11, the drive force needs to be transmitted to the right and left rear wheels 14, 13 to cause the four-wheel drive vehicle 1 to travel forward using the traction of the right and left rear wheels 14, 13. For example, when a slip occurs in the left front wheel 11, the differential limiting function of the front differential 3 increases the drive force that is transmitted to the right front wheel 12, so that a slip is also likely to occur in the right front wheel 12 and accordingly a slip may occur in both the right and left front wheels 12, 11.

Thus, in the present embodiment, when a slip occurs in one of the right and left front wheels 12, 11 during traveling and the drive force is transmitted to the right and left rear wheels 14, 13 by controlling the drive force transmission device 6, a delay process is performed for delaying the rise of the drive force that is transmitted to the right and left rear wheels 14, 13 by the drive force transmission device 6. The rise of the drive force includes a start of transmission of the drive force and an increase of the drive force. This delay process is performed in each of the following cases: a case in which a slip occurs in one of the right and left front wheels 12, 11 during traveling in a two-wheel drive state in which the drive force is not distributed to the right and left rear wheels 14, 13 and transmission of the drive force to the right and left rear wheels 14, 13 is started; and a case in which a slip occurs in one of the right and left front wheels 12, 11 during traveling in a state in which a smaller drive force is transmitted to the right and left rear wheels 14, 13 than the right and left front wheels 12, 11, and the drive force that is transmitted to the right and left rear wheels 14, 13 is increased.

Accordingly, for example, when a slip occurs in the left front wheel 11, a part of the drive force distributed to the left front wheel 11 is first distributed to the right front wheel 12 by the differential limiting function of the front differential 3, and when the slip of the left front wheel 11 is not stopped, the drive force that is transmitted from the drive force transmission device 6 to the right and left rear wheels 14, 13 is increased. By controlling the drive force distribution ratio of each wheel in such a procedure, stable traveling can be achieved even when traveling on a road with low friction coefficient. Next, a more specific example of the control executed by the control device 7 will be described with reference to FIG. 3.

FIG. 3 is a control block diagram illustrating an example of control executed by the control device 7. The CPU 71 of the control device 7 functions as each calculation unit shown in FIG. 3 by executing a program stored in the storage unit 72. These functions may be achieved through hardware such as an application-specific integrated circuit (ASIC) or a field-programmable gate array (FPGA).

The CPU 71 serving as a drive force response torque calculation unit 91 calculates drive force response torque based on the detection value of the accelerator pedal sensor 89. The drive force response torque is a command torque component corresponding to the magnitude of the drive force generated by the engine 15, and is set to a larger value with a larger depression amount of the accelerator pedal 18.

Further, the CPU 71 serving as a steering angle response torque calculation unit 92 calculates steering angle response torque based on the detection value of the steering angle sensor 88, and the detection values of the right-left acceleration sensor 86 and the yaw rate sensor 87. The steering angle response torque is a command torque component mainly used for improving steering stability during turning. The steering stability represents a performance that allows the vehicle to turn stably corresponding to the driver's intention in response to the driver's operation of the steering wheel 17.

Further, the CPU 71 serving as a front-rear acceleration response torque calculation unit 93 calculates front-rear acceleration response torque based on the detection value of the front-rear acceleration sensor 85. The front-rear acceleration response torque is a command torque component mainly used for increasing the ratio of the drive force distributed to the right and left rear wheels 14, 13 during uphill traveling to stably travel on a slope.

Further, the CPU 71 serving as a differential response torque calculation unit 94 calculates differential response torque based on the detection values of the rotation speed sensors 81 to 84. The differential response torque is a command torque component mainly used for increasing the ratio of the drive force distributed to the right and left rear wheels 14, 13 when a slip occurs in the right and left front wheels 12, 11 to cause the slip to stop.

Next, the process of the differential response torque calculation unit 94 will be described in more detail. The CPU 71 serving as a left front wheel slip ratio calculation unit 941 calculates the slip ratio of the left front wheel 11, and the CPU 71 serving as a right front wheel slip ratio calculation unit 942 calculates the slip ratio of the right front wheel 12. Here, the slip ratio is a slip ratio in the drive state, and is a value represented by $(R\omega-V)/R\omega$, where V is the vehicle speed, R is the radius of the wheel, and w is the wheel speed (rotational angular speed). The vehicle speed information may be obtained, for example, through communication with a host controller that controls the entire four-wheel drive vehicle 1, or may be obtained based on the rotation speed of the wheel having the slowest rotation speed of the right and left front wheels 12, 11 and the right and left rear wheels 14, 13.

A right-left slip ratio selector 943 selects the smaller one of the calculated slip ratio of the left front wheel 11 and the right front wheel 12. For example, when the slip ratio of the left front wheel 11 is larger than the slip ratio of the right front wheel 12, the slip ratio of the right front wheel 12 is selected. A right-left slip ratio difference calculation unit 944 calculates a slip ratio difference that is an absolute value of the difference between the slip ratio of the left front wheel 11 and the slip ratio of the right front wheel 12.

A calculation filter unit 945 performs a low-pass filtering process on the slip ratio difference to suppress (delay) a sudden change in the differential response torque of the slip between the right and left wheels. A time constant of the low-pass filtering process is, for example, 0.5 seconds. An adder 946 adds the slip ratio difference subjected to the low-pass filtering process in the calculation filter unit 945 to the slip ratio selected by the right-left slip ratio selector 943 to obtain an added slip ratio.

A differential response torque calculation unit 947 refers to a differential response torque map 721 stored in the storage unit 72 based on the added slip ratio and the vehicle speed to determine the differential response torque. The differential response torque map 721 defines the relationship between the added slip ratio and the differential response torque depending on the vehicle speed. Specific examples of the differential response torque map 721 will be described later.

An adder 95 adds together the drive force response torque calculated by the drive force response torque calculation unit 91, the steering angle response torque calculated by the steering angle response torque calculation unit 92, the front-rear acceleration response torque calculated by the front-rear acceleration response torque calculation unit 93, and the differential response torque calculated by the differential response torque calculation unit 94 to calculate the command torque. This command torque represents a command value of the drive force that is transmitted from the drive force transmission device 6.

A PWM control unit 96 calculates the duty ratio of a PWM signal based on the command torque, and a switching element of the switching power supply unit 73 is turned on and off by the PWM signal. Thus, a current having a magnitude corresponding to the command torque is supplied to the electromagnetic coil 66 of the drive force transmission device 6, and the drive force is transmitted to the right and left rear wheels 14, 13 accordingly.

As in the above control process, the process in which the right-left slip ratio selector 943 selects the smaller one of the slip ratio of the left front wheel 11 and the slip ratio of the right front wheel 12 and the right-left slip ratio difference calculation unit calculates the command torque based on the selected slip ratio is an example of a delay process for delaying the rise of the drive force that is transmitted by the drive force transmission device 6. That is, when the command torque is calculated based on the larger one of the two slip ratios (the slip ratio of the wheel in which the slip has occurred), the drive force that is transmitted from the drive force transmission device 6 rises more quickly. However, in the present embodiment, the right-left slip ratio selector 943 selects the smaller one of the slip ratio of the left front wheel 11 and the slip ratio of the right front wheel 12, so that the rise of the drive force that is transmitted is delayed by the drive force transmission device 6.

In the above control process, the rise of the drive force that is transmitted is also delayed by the drive force transmission device 6 with the calculation filter unit 945 performing the low-pass filtering process. That is, in the present embodiment, the slip ratio difference subjected to the low-pass filtering process is added to the smaller one of the slip ratio of the left front wheel 11 and the slip ratio of the right front wheel 12 to obtain an added slip ratio. By calculating the command torque based on the added value (added slip ratio), the rise of the drive force that is transmitted is delayed by the drive force transmission device 6.

Figure 4A:
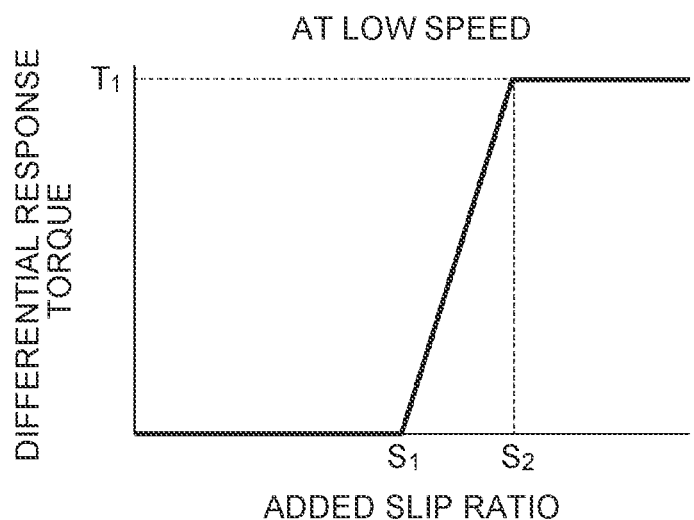
FIG. 4A illustrates an example of a differential response torque map in a graph format.
Figure 4B:
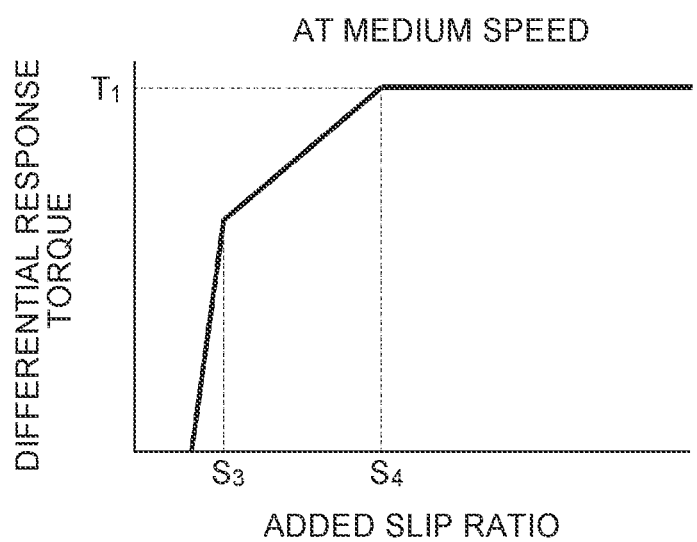
FIG. 4B illustrates another example of a differential response torque map in a graph format.
Figure 4C:
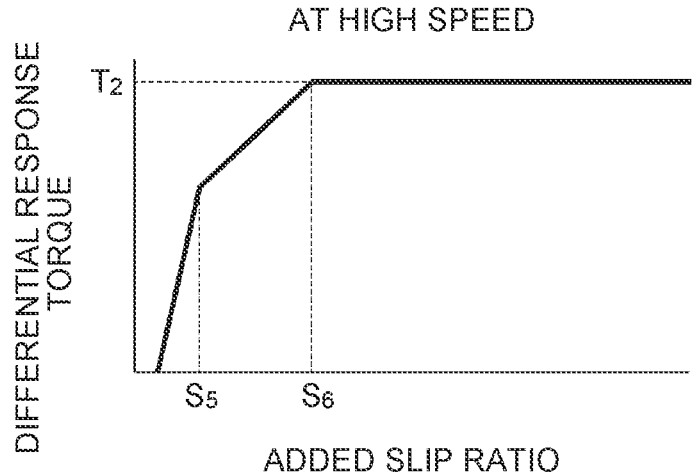
FIG. 4C illustrates still another example of a differential response torque map in a graph format.

FIGS. 4A to 4C are graphs showing examples of the differential response torque map 721 in a graph format. In the present embodiment, the relationship between the added slip ratio and the differential response torque is defined based on three vehicle speed ranges: a low speed range, a medium speed range, and a high speed range. In the graphs shown in FIGS. 4A to 4C, the scale on the horizontal axis indicating the added slip ratio and the scale on the vertical axis indicating the differential response torque are the same.

In the low speed range, as shown in FIG. 4A, a dead range in which the differential response torque is zero is set in a range in which the added slip ratio is small. This dead range is set to restrain the slip ratio from fluctuating greatly due to a slight wheel slip in the low speed range, and to restrain the differential response torque from increasing more than necessary. When the added slip ratio exceeds a predetermined value $S_1$ and becomes equal to or larger than values in the dead range, the differential response torque gradually increases, and when the added slip ratio reaches a predetermined value $S_2$, the differential response torque indicates a constant value $T_1$.

In the middle speed range, as shown in FIG. 4B, the differential response torque gradually increases at multiple change rates based on the increase in the added slip ratio. In the example shown in FIG. 4B, when the added slip ratio is less than a predetermined value $S_3$, the change rate of the differential response torque is large, and when the added slip ratio exceeds the predetermined value $S_3$, the change rate of the differential response torque becomes smaller. When the added slip ratio is equal to or more than a predetermined value $S_4$, the differential response torque indicates the constant value $T_1$.

In the high speed range, as shown in FIG. 4C, the differential response torque increases at a two-step change rate in which the change rate is shifted around a predetermined value $S_5$ based on the increase in the added slip ratio. The differential response torque reaches a constant value $T_2$ at a predetermined value $S_6$ that is smaller than the predetermined value $S_4$ in the middle speed range, and the value of $T_2$ is smaller than the value of $T_1$ in the middle speed range. As described above, the maximum value of the differential response torque is smaller in the high speed range than in the middle speed range.

Operations and Effects of Embodiment

According to the embodiment described above, when a slip occurs in one of the right and left front wheels 12, 11 during traveling and a drive force is transmitted to the right and left rear wheels 14, 13 by controlling the drive force transmission device 6, a delay process is performed to delay the rise of the drive force that is transmitted to the right and left rear wheels 14, 13 by the drive force transmission device 6, so that when a slip occurs in the left front wheel 11, for example, the traction of the right front wheel 12 can be utilized by the differential limiting function of the front differential 3. The turning performance can thus be improved, and running performance is also improved because when a slip occurs in both the right and left front wheels 12, 11, the torque is transmitted to the rear wheels.

APPENDIX

Although the disclosure has been described based on the embodiment, the embodiment does not limit the disclosure according to the claims. It should be noted that all combinations of the features described in the embodiment are not essential for means for solving the problem according to the disclosure.

The disclosure can be appropriately modified and implemented without departing from the spirit thereof. For example, in the above embodiment, the case in which the disclosure is applied to the four-wheel drive vehicle 1 having the FF layout has been described. However, the disclosure is not limited to this, and the disclosure can also be applied to a four-wheel drive vehicle having a front-engine, rear-wheel-drive (FR) layout in which the right and left rear wheels are used as main drive wheels, and the right and left front wheels are used as auxiliary drive wheels.

Further, in the embodiment described above, the case has been described in which the differential limiting force for limiting the differential rotation between the first and second side gears 34, 35 is generated by the frictional resistance generated when the tip surfaces of the first and second pinion gears 32, 33 slide on the inner surfaces of the bores 311a, 311b, and the frictional resistance generated between the first and second side gears 34, 35, the center washer 36, and the pair of side washers 37, 38. However, the configuration for generating the differential limiting force is not limited to this. For example, the differential limiting force may be generated by a friction clutch including a plurality of clutch plates. In this case, the friction clutch is provided, for example, between the differential case and one of the side gears, and is pressed by, for example, a piston operated by an electromagnetic force.

What is claimed is:

1. A four-wheel drive vehicle comprising:
right and left main drive wheels and right and left auxiliary drive wheels; and
a drive force transmission system configured to constantly transmit a drive force of a drive source to the right and left main drive wheels and to transmit the drive force to the right and left auxiliary drive wheels depending on a vehicle state; wherein
the drive force transmission system includes
  a differential device configured to distribute the drive force to the right and left main drive wheels,
  a propeller shaft configured to transmit the drive force in a vehicle front-rear direction,
  a drive force transmission device configured to adjust the drive force that is transmitted from the propeller shaft to the right and left auxiliary drive wheels, and
  an electronic control unit configured to control the drive force transmission device, wherein
the differential device has a differential limiting function that generates a differential limiting force for limiting a differential rotation between the right and left main drive wheels, and wherein
the electronic control unit is configured to perform, when a slip occurs in one of the right and left main drive wheels and the electronic control unit controls the drive force transmission device to transmit the drive force to the right and left auxiliary drive wheels, a delay process for delaying a rise of the drive force that is transmitted by the drive force transmission device.

2. The four-wheel drive vehicle according to claim 1, wherein the delay process is a process in which a command value of the drive force that is transmitted from the drive force transmission device is calculated based on a smaller one of a slip ratio of the right main drive wheel and a slip ratio of the left main drive wheel.

3. The four-wheel drive vehicle according to claim 1, wherein the delay process is a process in which a difference between slip ratios of the right and left main drive wheels is calculated, a low-pass filtering process is performed on the difference, and the difference that has been subjected to the low-pass filtering process is added to a smaller one of a slip ratio of the right main drive wheel and a slip ratio of the left main drive wheel to obtain an added slip ratio, and a command value of the drive force that is transmitted from the drive force transmission device is calculated based on the added slip ratio.

* * * * *